Patented Feb. 4, 1936

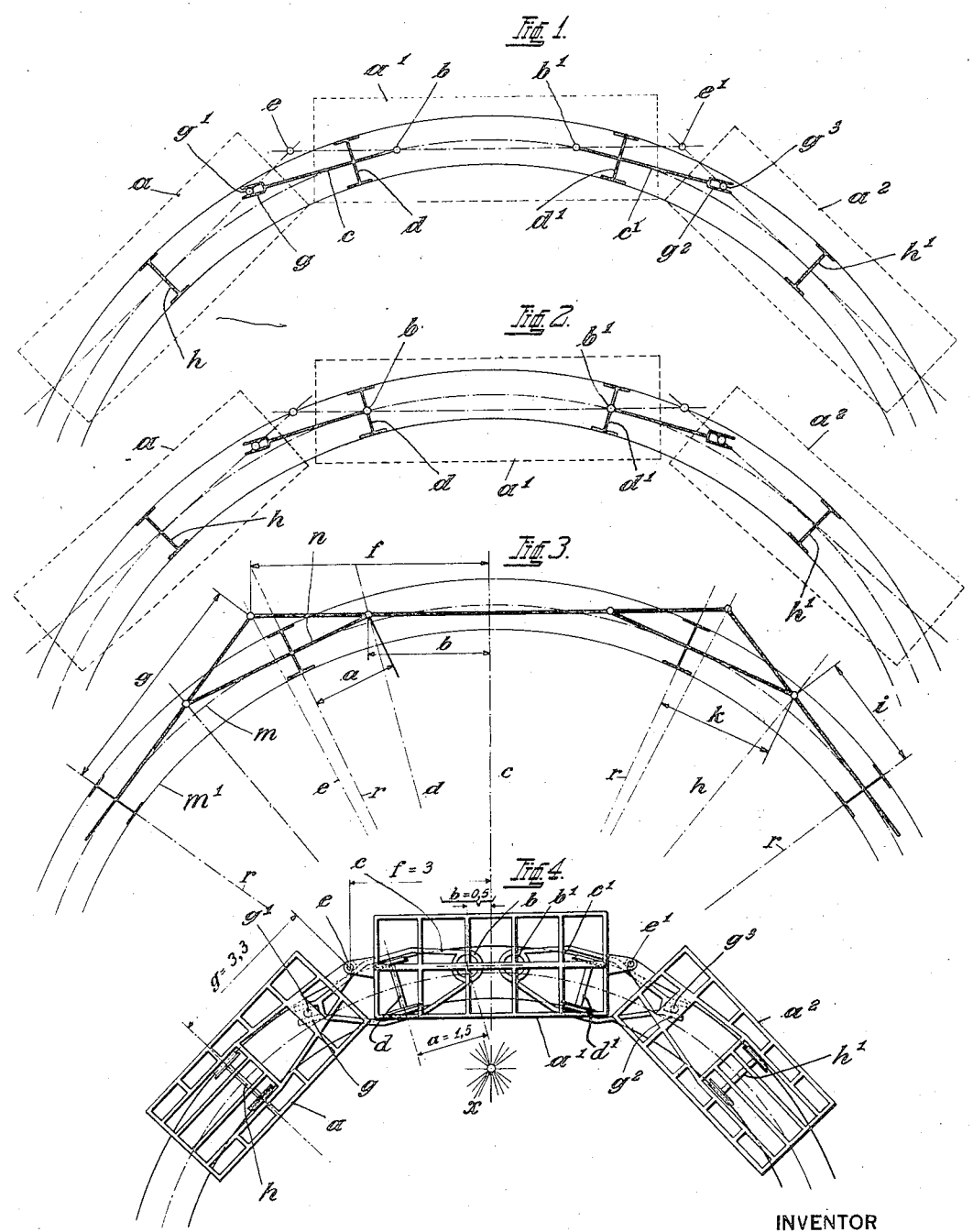

2,030,010

UNITED STATES PATENT OFFICE 2,030,010

ARTICULATED TRACK VEHICLE

Hermann Liechty, Bern, Switzerland

Application July 26, 1932, Serial No. 624,827
In Switzerland August 5, 1931

1 Claim. (Cl. 105—3)

The present invention relates to a track vehicle consisting of three vehicle parts pivotally connected together, whereby the central vehicle part rests on two single axis pivots. Each of these pivots is rotatably mounted at one end on a pin of the central vehicle part, and its other end is disposed rotatably and at the same time longitudinally slidably on a pin of the abutting end vehicle part, whereby the length of the central vehicle part is determined by the formula $g^2=f^2-a^2+b^2$ wherein $f$ designates the half length of the central vehicle part, $g$ the distance of the wheel axle of each end vehicle part from the connecting point to the central vehicle part, $b$ the distance of the connecting point of each pivot on the central vehicle part from the central point of this vehicle part, and $a$ the distance of the pivot axis from said connecting point.

Through this arrangement the end vehicle parts, on traversing curves, control the pivot frame axles so that they adjust themselves to the curve, without it being necessary that the longitudinal central line of the central part form a tangent at the track central line. As a result the central vehicle part can be given a greater length than hitherto possible. The capacity of the vehicle is substantially increased thereby.

The invention is illustrated for better comprehension on the accompanying drawing.

Fig. 1 is a diagrammatic view from below showing the arrangement of the pivot frames and their connecting points on the vehicle, Fig. 2 is a similar diagrammatic view of a modification, Fig. 3 is a diagram for deriving the formula for calculating the position of the connecting point and the length of the central vehicle part, Fig. 4 is a plan view of the vehicle shown in Fig. 1, but showing only the vehicle chassis with the pivotal frames, with the vehicle bodies omitted.

The vehicle of Fig. 4 consists of three vehicle parts $a$, $a^1$, $a^2$. Hereinafter the part $a^1$ is designated as the central part and $a$, $a^2$ as the end parts. Each two abutting vehicle parts are connected together by means of pins $e$ and $e^1$, which engage in eyelets of the frames of the vehicle parts. The central part $a^1$ rests on two pivotal frames $c$ and $c^1$. Each frame has a wheel axle $d$ and $d^1$, while each end vehicle part $a$ and $a^2$ rests on an axle $h$ and $h^1$. The pivot frame $c$ is connected at one end to a pin $b$ attached to the frame of the central vehicle part. Its other end is provided with a coupling $g$ which engages on a pin $g^1$ of the end vehicle part, so that the pivot frame can turn or rotate about this pin $g^1$ relative to the end part $a$ as well as describe sliding movement longitudinally. In exactly the same manner frame $c^1$ is rotatable on the central part $a^1$ about the pin $b^1$ and, by means of a coupling $g^2$, disposed rotatably and longitudinally slidably on a pin $g^3$ of part $a^2$. The construction of the pins $b$, $b^1$ and $g^1$, $g^3$ is obvious to all skilled in the art and need no detailed explanation here.

As may be seen from Fig. 1, bearing the same reference characters for the same parts as Fig. 4, on traversing curves, by means of the pins $g^1$, $g^3$, moving toward the outside of the curve, the pivot frames $c$, $c^1$ are carried along by means of their couplings $g$, $g^2$ and at the same time rotate about pins $b$ and $b^1$. The diagram of Fig. 3 shows why, in this rotation of frame $c$ or $c^1$, their axes are adjusted radially to the curve.

This figure shows a curve the center of which is at $x$ (below Fig. 4). $m$ designates the center line of the track $m^1$. If the axis of the frame is to be radial in the curve the longitudinal axis $n$ of the pivot frame must form a tangent on the central line $m$. Then, as shown in Fig. 3, the triangles formed with the radii $r$, $e$, $d$, $c$, etc. are all right angle triangles, and the following relations apply:

$$r^2+a^2=d^2 \quad (1)$$
$$d^2=c^2+b^2 \quad (2)$$

from which follows that $$c^2=r^2+a^2-b^2 \quad (3)$$

also $$e^2=f^2+c^2$$

or (according to Equation 3)

$$e^2=f^2+r^2+a^2-b^2$$

since $$e^2=r^2+g^2 \quad (4)$$

it follows from $$r^2+g^2=f^2+r^2+a^2-b^2$$

or $$g^2=f^2+a^2-b^2.$$

A comparison of Fig. 3 with Fig. 1 thus shows that:

$g$ is the distance of point $e$ (Fig. 1) from axle $h$ (or the distance of point $e^1$ from axle $h^1$);

$f$ is the half length of the central vehicle part $a^1$;

$a$ is the distance of the connecting pin $b$ or $b^1$ from the pivot frame axle $d$ or $d^1$;

$b$ is the distance of the pin $b$ or $b^1$ from the central point of the frame of the central part $a^1$.

The axles $d$, $d^1$ (Figs. 1 and 4) thus actually adjust themselves radially on curves with the described selection of the connecting points $b$, $b^1$, $g^1$, $g^3$, whereby however the lines $e$, $e^1$, that is, the longitudinal axis of the central vehicle part, as shown on Figs. 1 and 3, need not form a tangent at the central line of the track. It is of course, obvious that the vehicle described can be constructed otherwise also, so that the couplings $g$ or $g^2$ of each pivot frame engages with pin $b$ or $b^1$, and whereby the other end of each pivot frame is connected only rotatably with the corresponding end of the wagon or vehicle part.

The embodiment of Fig. 2 differs from the vehicle of Fig. 4 only in that the pins $b$, $b^1$ are placed directly above the pivot frame axles $d$, $d^1$.

I claim:

In a track vehicle, the combination of three vehicle parts which are pivotally inter-connected, with two single axle pivot frames, which carry the central vehicle part, the two ends of each pivot frame being rotatably arranged at two abutting vehicle parts and also one of said pivot frame ends being at the same time connected longitudinally slidably with one of said vehicle parts.

HERMANN LIECHTY.